(12) United States Patent
Wolf et al.

(10) Patent No.: US 10,183,593 B2
(45) Date of Patent: Jan. 22, 2019

(54) VEHICLE SEAT HAVING AN EASY-ENTRY MODULE

(71) Applicant: Adient Luxembourg Holding S.à.r.l., Luxembourg (LU)

(72) Inventors: Christian Wolf, Dielkirchen (DE); Jan Simo, Trencín (SK); Thomas Dill, Heiligenmoschel (DE); Olaf Kreuels, Zweibrücken (DE); Heinrich Hammann, Teschenmoschel (DE)

(73) Assignee: Adient Luxembourg Holding S.àr.l., Luxembourg (LU)

( * ) Notice: Subject to any disclaimer, the term of this patent is extended or adjusted under 35 U.S.C. 154(b) by 38 days.

(21) Appl. No.: 15/417,695

(22) Filed: Jan. 27, 2017

(65) Prior Publication Data

US 2017/0217336 A1 Aug. 3, 2017

(30) Foreign Application Priority Data

Jan. 28, 2016 (DE) .................. 10 2016 201 301
May 24, 2016 (DE) .................. 10 2016 209 007

(51) Int. Cl.
*B60N 2/06* (2006.01)
*B60N 2/08* (2006.01)
*B60N 2/20* (2006.01)
*B60N 2/68* (2006.01)

(52) U.S. Cl.
CPC ............. *B60N 2/062* (2013.01); *B60N 2/08* (2013.01); *B60N 2/20* (2013.01); *B60N 2/68* (2013.01)

(58) Field of Classification Search
CPC . B60N 2/062; B60N 2/08; B60N 2/20; B60N 2/06; B60N 2/12

USPC .................. 297/344.1, 367, 366, 367 R
See application file for complete search history.

(56) References Cited

U.S. PATENT DOCUMENTS

| 6,513,868 | B1* | 2/2003 | Tame | B60N 2/0705 |
| | | | | 297/341 |
| 7,025,419 | B2 | 4/2006 | Sasaki et al. | |
| 8,167,372 | B2* | 5/2012 | Hazlewood | B60N 2/0705 |
| | | | | 248/429 |
| 8,528,974 | B2* | 9/2013 | Nihonmatsu | B60N 2/06 |
| | | | | 248/419 |
| 8,573,674 | B2* | 11/2013 | Otsuka | B60N 2/0715 |
| | | | | 296/65.09 |
| 8,596,720 | B2* | 12/2013 | Ootsuka | B60N 2/0296 |
| | | | | 296/65.11 |

(Continued)

FOREIGN PATENT DOCUMENTS

| DE | 10 2009 033 892 A1 | 2/2011 |
| DE | 10 2014 217 754 A1 | 3/2015 |
| FR | 2 983 794 A1 | 6/2013 |

*Primary Examiner* — Jose V Chen
(74) *Attorney, Agent, or Firm* — McGlew and Tuttle, P.C.

(57) ABSTRACT

A vehicle seat (1) has an easy-entry module (6). A backrest (2) is adjustable relative to a seat part (3) between at least one comfort position (P1) and at least one easy-entry position (P3). The backrest (2) is, together with the seat part (3), arranged so as to be longitudinally displaceable by way of rails (4) along a movement travel (W) over a longitudinal adjustment range (L) at least between two seat positions (S1.1 to S1.*n*). To limit the movement travel (W), at least one switchable abutment (10) is provided in the region of the rails (4). The backrest (2) is, at a predefined seat position (S2), settable upright by way of the switchable abutment (10) from the easy-entry position (P3) into the comfort position (P1) and lockable to the seat part (3) in the predefined seat position (S2).

15 Claims, 5 Drawing Sheets

(56) References Cited

U.S. PATENT DOCUMENTS

| | | | |
|---|---|---|---|
| 8,646,840 B2* | 2/2014 | Stojanovic | B60N 2/26 296/65.09 |
| 9,233,627 B2* | 1/2016 | Michalak | B60N 2/0232 |
| 9,868,369 B1* | 1/2018 | Aktas | B60N 2/20 |
| 9,914,431 B2* | 3/2018 | Tsunoda | B60R 25/014 |
| 2003/0080601 A1* | 5/2003 | Charras | B60N 2/206 297/378.12 |
| 2004/0051361 A1* | 3/2004 | Rausch | B60N 2/0705 297/341 |
| 2007/0013218 A1* | 1/2007 | Kayumi | B60N 2/0232 297/344.1 |
| 2008/0252126 A1* | 10/2008 | Bartoi | B60N 2/0232 297/341 |
| 2009/0108655 A1* | 4/2009 | Yokoyama | B60N 2/12 297/344.11 |
| 2010/0176641 A1* | 7/2010 | Hayakawa | B60N 2/12 297/378.12 |
| 2010/0244524 A1* | 9/2010 | Kumazaki | B60N 2/12 297/341 |
| 2013/0162000 A1* | 6/2013 | Kume | B60N 2/90 297/463.1 |
| 2013/0285428 A1* | 10/2013 | Livesey | B60N 2/06 297/317 |
| 2014/0375095 A1* | 12/2014 | Schumann | B60N 2/0705 297/344.1 |
| 2015/0203011 A1* | 7/2015 | Fujita | B60N 2/68 297/284.11 |
| 2016/0016490 A1* | 1/2016 | Ngiau | B60N 2/12 297/344.1 |
| 2017/0080825 A1* | 3/2017 | Bonk | B60N 2/0244 |
| 2017/0291507 A1* | 10/2017 | Hattori | B60N 2/20 |
| 2018/0065510 A1* | 3/2018 | Aktas | B60N 2/20 |

\* cited by examiner

VEHICLE SEAT HAVING AN EASY-ENTRY MODULE

CROSS REFERENCE TO RELATED APPLICATIONS

This application claims the benefit of priority under 35 U.S.C. § 119 of German Applications DE 10 2016 201 301.7 filed Jan. 28, 2016, and DE 10 2016 209 007.0 filed May 24, 2016, and, the entire contents of which are incorporated herein by reference.

FIELD OF THE INVENTION

The present invention relates to a vehicle seat having an easy-entry module.

BACKGROUND OF THE INVENTION

Various easy-entry systems are known which are a constituent part of a vehicle seat and which permit easier boarding into a second seat row of a vehicle. The easy-entry system is actuable by way of an unlocking lever which is normally arranged at a backrest upper edge of the vehicle seat, whereby the backrest of the vehicle seat pivots out of a boarding region. If the vehicle seat is arranged on rails, the vehicle seat may additionally or alternatively be displaceable in the direction of travel upon actuation of the unlocking lever.

SUMMARY OF THE INVENTION

It is an object of the present invention to specify a vehicle seat, with an easy-entry module, which is improved in relation to the prior art.

According to the invention, a vehicle seat is provided having an easy-entry module comprises a backrest, which is adjustable relative to a seat part between at least one comfort position and at least one easy-entry position. The backrest is, together with the seat part, arranged so as to be longitudinally displaceable by way of rails along a movement travel over a longitudinal adjustment range at least between two seat positions, to limit the movement travel, at least one switchable abutment is provided in the region of the rails, and the backrest is, at a predefined seat position, settable upright by way of the switchable abutment from the easy-entry position into the comfort position and lockable to the seat part in the predefined seat position.

Here, the switchable abutment interacts with a counterpart abutment. The counterpart abutment is arranged fixedly, and for example on a fixed part of the rails. In particular, the counterpart abutment is arranged on a fixed rail or on a side part of the fixed rail, and the switchable abutment is arranged on a rail which is movable relative to the fixed rail or on a part which is connected to the movable rail. The counterpart abutment is advantageously arranged on a face-side end of the fixed rail or on the side part. During the backward movement of the seat, the switchable abutment abuts against the face-side or end-side counterpart abutment of the fixed rail or of the fixed side part and switches, whereby the backrest is settable upright into the comfort position.

The advantages achieved by way of the invention consist in particular in that, by way of a defined setting-upright of the backrest and locking of the set-upright backrest to the seat part in the predefined seat position, and thus of the vehicle seat, a risk of injury to an occupant sitting behind the easy-entry vehicle seat is reduced or even eliminated. In particular, the risk of the vehicle seat being pushed against legs or feet of an occupant of a seat row situated behind is reduced. That is to say, the vehicle seat does not firstly have to be adjusted into the rearmost seat position and longitudinal adjustment position for the release of an uprighting lock of the backrest and for the locking of the backrest to the seat part. A compromise is thus reached for a free space in both seat rows.

In a further embodiment of the vehicle seat, to limit the movement travel, a counterpart abutment which corresponds with the switchable abutment is provided in the region of the rails ahead of a rearmost seat position. Here, the vehicle seat with the easy-entry function is set upright at a defined seat position by way of the switchable abutment which abuts against the counterpart abutment, and which is situated ahead of the rearmost, or in an alternative embodiment of the vehicle seat ahead of a foremost, seat position or longitudinal adjustment position. In other words, the vehicle seat is not locked only in a first or last possible seat position.

A further embodiment of the vehicle seat provides that the seat part is, after the locking to the backrest at the predefined seat position, displaceable over the entire longitudinal adjustment range. The locked vehicle seat can, after the locking of the backrest to the seat part in the predefined seat position, be longitudinally adjusted in the normal way and, in particular, can be adjusted beyond the predefined seat position into one of the rearward seat positions.

In a further embodiment of the vehicle seat, at least one switching element is arranged between the switchable abutment and the easy-entry module. One possible embodiment of the vehicle seat provides that the switchable abutment is switchable by way of the at least one switching element. In particular, the switchable abutment is switchable automatically at the predefined seat position. For this purpose, the switching element may be in the form of a compensation element, in particular a compensation spring, or in the form of a tensile spring. Furthermore, a stable connection of the switchable abutment to the easy-entry module is made possible by way of the switching element.

The switching element, which is in the form of a compensation element, is designed, in particular preloaded, such that the switchable abutment is switched over during the transfer of the vehicle seat from a present seat position into the easy-entry position. In particular, the switching element permits a simple adjustment of an abutment pawl of the switchable abutment, such that the switchable abutment, in particular the abutment pawl, after travelling over the counterpart abutment, can be deflected and for example rotated downward.

In one possible embodiment of the vehicle seat, the switchable abutment is arranged within and/or outside the rails. The switchable abutment is arrangeable within or outside the rails in a manner dependent on a possible structural space, in particular in the region of the rails, or on a shape/dimension of the rails. An abutment arranged within the rails is in particular protected against fouling.

One possible refinement of the vehicle seat provides that the switchable abutment is arranged on at least one of the rails or on a frame element of the seat part. For example, the switchable abutment is integrable into an already existing rail system of a vehicle seat with an easy-entry module, or is arrangeable on an already existing seat part of the vehicle seat for the purposes of limiting the movement travel.

In an alternative refinement of the vehicle seat, the switchable abutment comprises at least the abutment pawl which has an abutment surface which corresponds with the counterpart abutment. The counterpart abutment is arranged on a fixed abutment rail. The abutment pawl is formed such that it is slidable on the abutment rail and is moved from the easy-entry position into the comfort position on the abutment rail during the backward movement of the seat part. The counterpart abutment is mounted in stable fashion by way of the abutment rail.

Exemplary embodiments of the invention will be discussed in more detail on the basis of the drawings. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Referring to the drawings, parts which correspond to one another are denoted by the same reference designations throughout the Figures.

Figure 1:
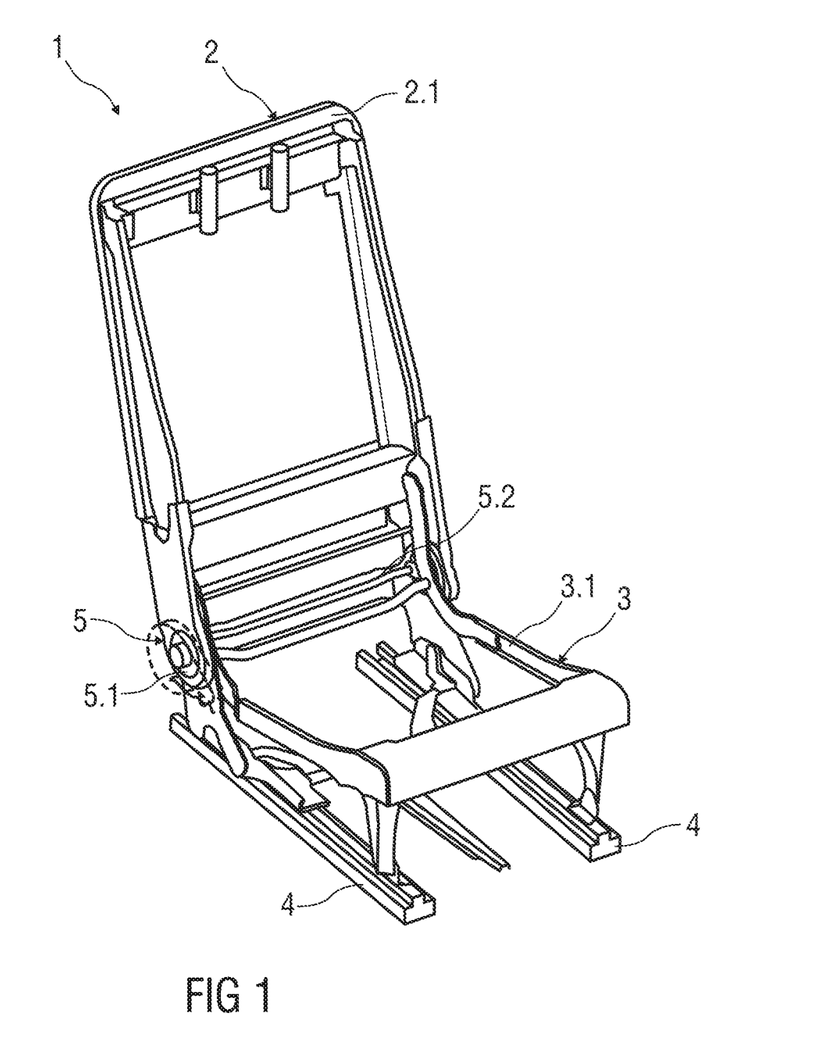
FIG. 1 is a schematic perspective view of a vehicle seat having a backrest and having a seat part.

FIG. 1 shows an exemplary embodiment of a vehicle seat 1 which comprises a backrest 2 and a seat part 3. The backrest 2 and the seat part 3 are schematically indicated. A frame part 2.1 of the backrest 2 and a frame element 3.1 of the seat part 3 are illustrated.

The arrangement of the vehicle seat 1 in the vehicle defines the coordinate system used below, comprising a vertical axis z, a longitudinal axis x and a transverse axis y, wherein the vertical axis z is parallel to the vehicle vertical direction, the longitudinal axis x is parallel to the vehicle longitudinal direction and the transverse axis y is parallel to the vehicle transverse direction.

The vehicle seat 1 is formed so as to be longitudinally displaceable in the longitudinal direction and is arranged for example on a vehicle floor in a manner not illustrated in any more detail. For the longitudinal adjustment, the vehicle seat 1, in particular the seat part 3, is arranged on rails 4 and is adjustable in the longitudinal direction on the rails 4 over a longitudinal adjustment range L by way of a longitudinal adjustment mechanism or rail-type adjuster (not illustrated in any more detail). The vehicle seat 1 is lockable and unlockable again at one of the seat positions S1.1 to S1.$n$. For example, the rails 4 have a rail movement travel of 200 mm to 300 mm, in particular of 230 mm.

For a comfortable sitting posture or for facilitating boarding, the backrest 2 is adjustable, in particular tiltable, relative to the seat part 3. For this purpose, the vehicle seat 1 has, for the backrest adjustment, a backrest adjuster 5 which has at least one fitting 5.1 which, in a manner not illustrated in any more detail, is connected to an oppositely situated rotary bearing by way of a transmission element 5.2 which is for example in the form of a rod.

Figure 2:
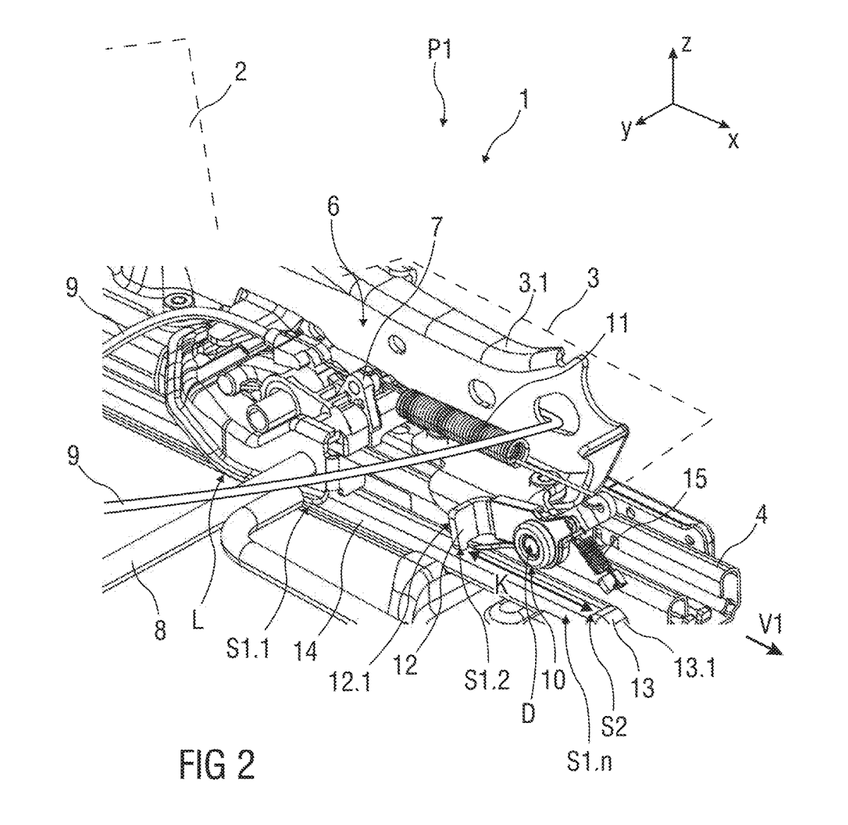
FIG. 2 is a schematic perspective view of an exemplary embodiment of the vehicle seat in a rearmost seat position, wherein the backrest has been adjusted relative to the seat part into a comfort position.

FIG. 2 shows the backrest 2 and the seat part 3 in a comfort position P1 in which a comfortable seat position can be assumed by a user. In the comfort position P1, the backrest 2 is positioned relative to the seat part 3 such that an occupant can assume a comfortable sitting posture.

The backrest adjuster 5 is coupled to an easy-entry module 6 for the unlocking of a rail locking means 7 which is controlled by way of the backrest adjustment.

In a further embodiment of the vehicle seat 1 which is not illustrated in any more detail, the backrest adjuster 5 is integrated into the easy-entry module 6.

Figure 5:
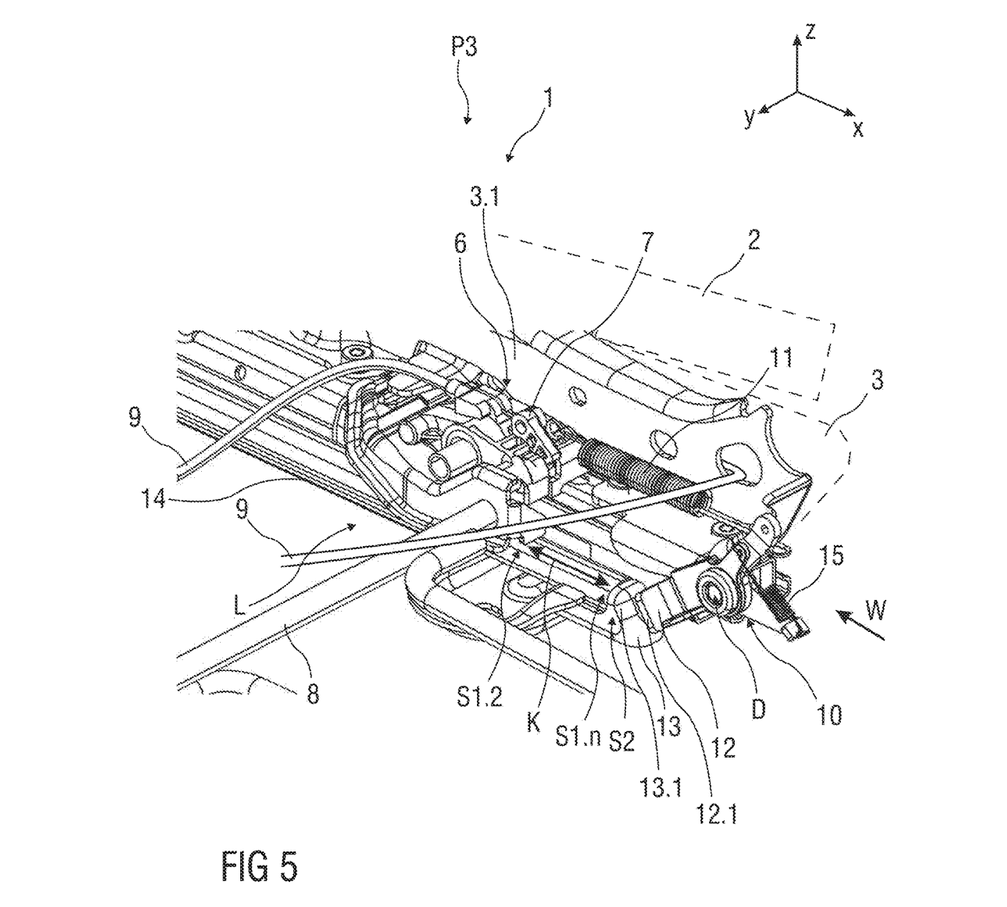
FIG. 5 is a schematic perspective view of the vehicle seat during the backward movement from the easy-entry position.

By way of the easy-entry module 6, the vehicle seat 1 is, after unlocking of the fitting 5.1 and unlocking of the rail locking means 7, adjustable into a forward position, in particular into an easy-entry position P3 illustrated in FIG. 5. Here, firstly, the backrest 2 is tilted forward, and the vehicle seat 1 adjusted forward into the easy-entry position P3, to such an extent that it is made easier for occupants to board into a rear seat row.

For example, the easy-entry module 6 may be arranged at each side of the backrest 2, such that, by unlocking the at least one fitting 5.1, a locking action of the backrest 2 is eliminable in order that the latter can be pivoted. Here, the vehicle seat 1 may be equipped with an easy-entry module 6 on one side or on both sides.

The easy-entry modules 6 arranged on both sides are for example connected to one another by way of a transmission rod 8. For the unlocking of the easy-entry module(s) 6, a tensile element 9, in particular a Bowden cable, is provided.

The backrest 2 is pivotable about a pivot axis which runs in the vehicle transverse direction. The pivoting of the backrest 2 is triggerable for example by actuating an actuating lever (not illustrated). For this purpose, the actuating lever may be provided on one side of the vehicle seat 1.

The at least one easy-entry module 6 comprises a switchable abutment 10 which, in the present exemplary embodiment, is arranged outside the rails 4. In particular, the switchable abutment 10 is movably arranged laterally (at the outside) with respect to the rails 4. Alternatively, the switchable abutment 10, or additionally a further abutment which is not shown in any more detail, may be arranged within the rails 4.

Here, the switchable abutment 10 is fastened to a movable part of the rails 4 or of the vehicle seat 1. For example, the switchable abutment 10 is arranged and fixed on the movable upper rail of the rails 4 or on the frame element 3.1 of the seat part 3. Here, the switchable abutment 10 is driven along in the longitudinal direction in accordance with the adjustment of the vehicle seat 1.

The switchable abutment 10 has an abutment pawl 12 which has an abutment surface 12.1 which corresponds with a counterpart abutment 13, in particular a counterpart abutment surface 13.1. Here, the switchable abutment 10 interacts with the counterpart abutment 13.

The counterpart abutment 13 is arranged outside the rails 4. Alternatively, the counterpart abutment 13 is arranged within the rails 4 if the switchable abutment 10 is likewise provided within the rails 4.

In a further embodiment, the counterpart abutment 13 is arranged for example on a fixed, non-movable part of the rails 4. For example, the counterpart abutment 13 is arranged and fastened on a fixed rail 4.1 or on a side part, for example on an abutment rail 14 of the fixed rail 4.1. The switchable abutment 10 is arranged on a rail 4.2 which is movable relative to the fixed rail 4.1 or on a part which is connected to the movable rail.

The counterpart abutment 13, in particular the counterpart abutment surface 13.1 thereof, is arranged on a face-side end of the fixed part of the rails 4, in particular on a face-side end of the fixed rail 4.1 (not illustrated) or of the abutment rail 14 (as shown). During the backward movement of the seat 1, the switchable abutment 10 abuts against the counterpart abutment 13 arranged on the face side or end side of the fixed rail 4.1 or of the fixed abutment rail 14 and switches, whereby the backrest 2 is settable upright into the comfort position.

The abutment pawl 12 is for example in the form of a single-armed short lever which is rotatable about a centre of rotation D of the switchable abutment 10. Alternatively, the abutment pawl 12 is in the form of a bent lug or tongue of the switchable abutment 10.

For example, the abutment pawl 12 and the counterpart abutment 13 are formed at least partially from plastic and/or metal. For example, the counterpart abutment surface 13.1 and/or the abutment surface 12.1 may each be formed from plastic, such that generation of noise upon the striking of the abutment pawl 12 against the counterpart abutment 13 is reduced or even eliminated. To increase stability and strength, the abutment pawl 12 and the counterpart abutment 13 may be formed from metal. A dimension of the abutment pawl 12 and of the counterpart abutment 13 may vary depending on the structural space.

The counterpart abutment 13 is arranged fixedly in the region of the rails 4. For example, the counterpart abutment 13 is fastened to a fixed, non-movable abutment rail 14. The switchable abutment 10 is arranged above the abutment rail 14 and can move relative to the counterpart abutment 13 during an adjustment of the seat.

The counterpart abutment 13 is fastened to the abutment rail 14, which is for example arranged parallel to the longitudinal direction of the rails 4, and said counterpart abutment forms a rail end of the abutment rail 14. In the embodiment illustrated, the counterpart abutment 13 is arranged on a forward-pointing end as per the arrow V1. The abutment rail 14 is formed so as to be fixed with respect to a vehicle body, and is for example fastened to a fixed part of the rails 4, such as the lower rail, and/or to the vehicle floor.

For example, the counterpart abutment 13 is in the form of a cap which is mounted and fixed on the rail end of the abutment rail 14. For example, the counterpart abutment 13 may be clipped, locked with detent action, adhesively bonded, welded and/or fastened in some other suitable manner to the rail end of the abutment rail 14. For example, the counterpart abutment 13 may be plugged into the inside of the rail end of the abutment rail 14. Alternatively or in addition, the counterpart abutment 13 may be fixed to the vehicle floor.

In an alternative embodiment of the vehicle seat 1, the rail end of the abutment rail 14 is in the form of a rounded, bevelled or angled edge which forms the counterpart abutment 13.

One possible refinement of the vehicle seat 1 provides that the abutment rail 14 is in the form of a lateral cover of the rails 4, such that the rails 4 are for example protected against fouling. Alternatively, the embodiment and/or arrangement of the abutment rail 14 is not necessary, wherein the abutment pawl 12 is deflected as it passes over the counterpart abutment 13. Here, the vehicle seat 1 has only one counterpart abutment 13, which is arranged for example on the fixed rail 4.

In particular, the switchable abutment 10 and the counterpart abutment 13 are provided for limiting a movement travel W of the vehicle seat 1 from the easy-entry position P3 backward into one of the rearward seat positions S1.1 to S1.$n$, and thus for the movement back into the comfort position P1 (FIG. 1). When the abutment 10 strikes the counterpart abutment 13, the backrest 2 is automatically set upright by way of the switchable abutment 10 from the easy-entry position P3 into the comfort position P1 at a predefined seat position S2. Furthermore, the backrest 2 is locked to the seat part 3 in the predefined seat position S2.

The switchable abutment 10 is connected by way of a switching element 11 to the easy-entry module 6. In particular, the switching element 11 is arranged between the switchable abutment 10 and the easy-entry module 6. In the illustrated form, the switchable abutment 10 is connected by way of the switching element 11 to the rail locking means 7, and is thus indirectly coupled by way of the rail locking means 7 to the easy-entry module 6. Alternatively (in a manner which is not illustrated in any more detail), the switchable abutment 10 and the easy-entry module 6 are directly coupled to one another by way of the switching element 11.

The switching element 11 is for example in the form of a compensation element, in particular a compensation spring, a tensile spring or some other suitable switching element which is preloaded in the folded-forward position P2 of the backrest 2 and in the easy-entry position P3 of the vehicle seat 1 after triggering of the easy-entry function. Here, with the triggering of the easy-entry function, the rail locking means 7 is unlocked by way of the easy-entry module 6 during the pivoting of the backrest 2 forward into the easy-entry position P3.

Figure 3:
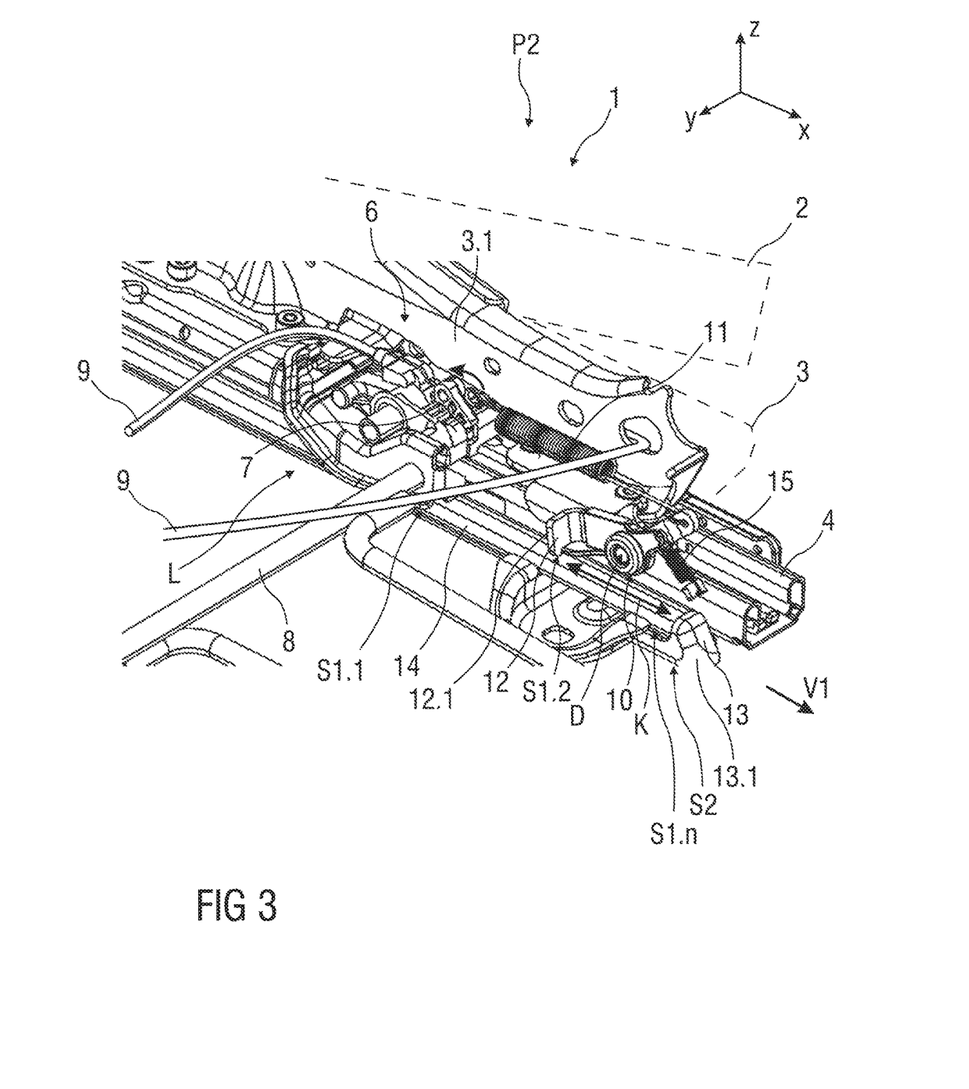
FIG. 3 is a schematic perspective view of the vehicle seat with a folded-forward backrest (backrest in easy-entry position, vehicle seat still in rearmost seat position)

FIG. 3 shows the backrest 2 in a folded-forward position P2 for the triggering of the easy-entry function of the vehicle seat 1. Here, the vehicle seat 1 has furthermore been adjusted into the rearmost seat position S1.1. The backrest 2 has been tilted forward through a certain angle relative to the comfort position P1 in FIG. 1.

After triggering of the easy-entry function and folding-downward of the backrest 2 into the folded-forward position P2, the vehicle seat 1 is moved forward as per the arrow V1 in order to make it easier for occupants to board into a rear seat row.

During the forward adjustment of the vehicle seat 1 with the folded-forward backrest 2, the switchable abutment 10 is moved and driven along in the longitudinal direction on the abutment rail 14. In said folded-forward position P2 of the backrest 2, the switching element 11, which is coupled to the switchable abutment 10, is preloaded, and the switchable abutment 10 is switchable. When the easy-entry position P3 is reached (FIG. 5), in which the backrest 2 is tilted forward and the vehicle seat 1 has been adjusted forward in the direction of travel in order to facilitate boarding, the switchable abutment 10 reaches the counterpart abutment 13 and the end of the abutment rail 14. Here, the abutment pawl 12 is deflected as it passes over the counterpart abutment 13, whereby the preloaded switching element 11 relaxes and the switchable abutment 10 switches.

To limit the movement travel W of the vehicle seat 1 from the easy-entry position P3 back into one of the rearward seat positions S1.1 to S1.$n$, and thus for the backward movement into the comfort position P1 (FIG. 1), the counterpart abutment 13 is provided. The counterpart abutment 13 predefines an intermediate stop in the adjustment of the vehicle seat 1 at the seat position S2, which is in particular situated ahead of the rearmost seat position S1.1 of the vehicle seat 1 as viewed in the longitudinal direction, as shown in FIG. 5. During the backward movement from the easy-entry position P3 into the comfort position P1, the switchable abutment 10 abuts against the counterpart abutment 13, whereby the abutment pawl 12 is placed into the engagement position by way of the preload of the switching element 11.

The adjustment travel of the vehicle seat 1 may have different lengths. For example, the spacing between the rearmost seat position S1.1 and the predefined seat position S2 situated ahead in the longitudinal direction amounts to 50 mm to 120 mm, in particular 90 mm.

Figure 4:
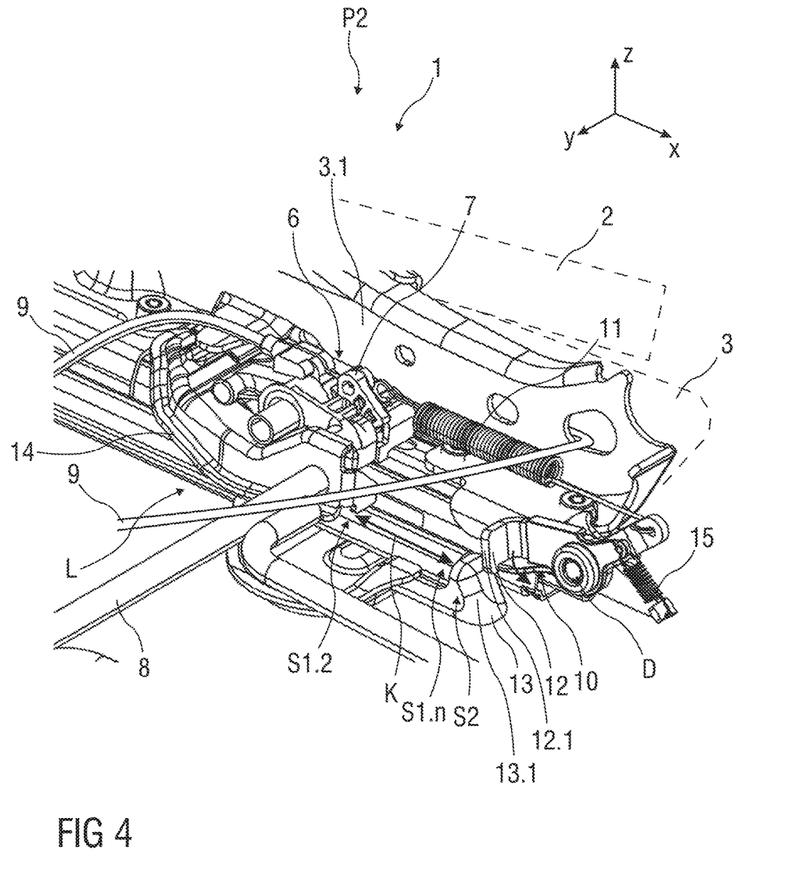
FIG. 4 is a schematic perspective view of the vehicle seat with the folded-forward backrest (backrest in easy-entry position, vehicle seat in a seat position spaced apart from the rearmost seat position)

FIGS. 4 and 5 show in each case the vehicle seat 1 with a forward-tilted backrest 2, wherein FIG. 4 shows the vehicle seat 1 in a seat position S1.2 spaced apart from the rearmost seat position S1.1, and FIG. 5 shows the vehicle seat 1 in the easy-entry position P3. In the easy-entry position P3, the vehicle seat 1 has been adjusted forward in the direction of travel for the purposes of facilitating boarding.

Upon triggering of the easy-entry function, the rail locking means 7 is unlocked by way of the easy-entry module 6 during the pivoting of the backrest 2 forward into the easy-entry position P3. As a result, the switching element 11 is braced such that the abutment pawl 12 lies against a contour K of the abutment rail 14 and slides along the latter during the adjustment of the vehicle seat 1 forward into the easy-entry position P3. The contour K of the abutment rail 14 is in the form of a sliding surface of the abutment pawl 12. By way of the preloaded switching element 11, the abutment 10 is automatically switchable at the predefined seat position S2.

As described with regard to FIGS. 2 and 3, the abutment pawl 12 slides over the counterpart abutment 13 during the forward movement of the vehicle seat 1 into the easy-entry position P3. Owing to the braced switching element 11, the switched abutment 10, in particular the abutment pawl 12, is switched over, for example rotated downward. During the backward movement of the vehicle seat 1 from the easy-entry position P3 into one of the rearward seat positions S1.n, the switched abutment 10 passes into an engagement position as soon as the abutment pawl 12 abuts against the counterpart abutment 13.

In other words: during the backward movement of the vehicle seat 1, the abutment pawl 12 abuts against the counterpart abutment 13. The backrest 2 is hereby set upright, and the rail locking means 7 locks the vehicle seat 1. The backrest 2 and the seat part 3 are locked to one another at the predefined seat position S2. The abutment pawl 12 is pulled out of the engagement position by way of a retraction spring 15 when the vehicle seat 1 is adjusted minimally rearward, that is to say away from the counterpart abutment 13, in the longitudinal direction. Here, an abutment impetus of the abutment pawl 12 against the counterpart abutment 13 gives rise to a spring-back action of the retraction spring 15. In particular, a pressure between the abutment pawl 12 and the counterpart abutment 13 is reduced such that the abutment pawl 12 is switched back by way of the spring-back action of the retraction spring 15. The switchable abutment 12 is now guidable over the counterpart abutment 13. It is also possible for the spring-back action of the retraction spring 15 to be actuated by way of a slight movement of the vehicle seat 1, in particular a shaking movement, performed by a user of the vehicle seat 1. In this way, the switchable abutment 10 is switched back. The abutment pawl 12 lies against the abutment rail 14 again only when the vehicle seat 1 is adjusted into one of the rearward seat positions S1.1 to S1.n. The vehicle seat 1 can now be unlocked by way of a normal longitudinal adjustment and adjusted further rearward over an entire longitudinal adjustment range L of the rails 4.

In one possible embodiment of the vehicle seat 1, the easy-entry function may be activated by an additional actuation means, in particular a Bowden cable, directly by way of the backrest adjustment.

In a further embodiment of the vehicle seat 1, the abutment 10 maybe in the engagement position in the design and comfort position P1, and may be eliminated for example by way of an actuation of the conventional longitudinal adjustment of the vehicle seat 1.

One refinement of the vehicle seat 1 provides that the abutment 10 and the easy-entry module 6 are connected to one another by way of a coupling element of rigid form, and/or are actuable by way of some other connecting element. For example, it would be possible for said actuation to be realized by way of an additional freewheel or compensation mechanism in the form of a further pawl.

The advantages achieved by way of the invention consist in particular in the fact that, by way of a defined setting-upright of the backrest 2 and a resulting locking of the vehicle seat 1, a risk of injury to an occupant seated behind the vehicle seat 1 with the easy-entry function is reduced or even eliminated.

While specific embodiments of the invention have been shown and described in detail to illustrate the application of the principles of the invention, it will be understood that the invention may be embodied otherwise without departing from such principles.

APPENDIX:
List of reference designations

| | |
|---|---|
| 1 | Vehicle seat |
| 2 | Backrest |
| 2.1 | Frame part |
| 3 | Seat part |
| 3.1 | Frame element |
| 4 | Rails |
| 5 | Backrest adjuster |
| 5.1 | Fitting |
| 5.2 | Transmission element |
| 6 | Easy-entry module |
| 7 | Rail locking means |
| 8 | Transmission rod |
| 9 | Tensile element |
| 10 | Abutment |
| 11 | Switching element |
| 12 | Abutment pawl |
| 12.1 | Abutment surface |
| 13 | Counterpart abutment |
| 13.1 | Counterpart abutment surface |
| 14 | Abutment rail |
| 15 | Retraction spring |
| P1 | Comfort position |
| P2 | Folded-forward position |
| P3 | Easy-entry position |
| S1.1 to S1.n | Seat position |
| S2 | Predefined seat position |
| K | Contour |
| V1 | Arrow |

What is claimed is:

1. A vehicle seat comprising:
a seat part;
a backrest;
rails;
an easy-entry module, wherein the backrest is adjustable relative to the seat part between at least one comfort position and at least one easy-entry position, the backrest is, together with the seat part, arranged so as to be longitudinally displaceable by way of the rails along a movement travel over a longitudinal adjustment range at least between two seat positions;
at least one switchable abutment, to limit the movement travel, provided in a region of the rails; and
a counterpart abutment at one of the rails, wherein:
with the seat being moved out of one of the seat positions and the backrest being moved, from the comfort position into the easy-entry position, the switchable abutment is configured to override the counterpart abutment causing the switchable abutment to switch into an end position; and
with the seat being moved in return, from the easy-entry position into the comfort position, the seat is stopped at the switchable abutment and with the backrest being moved in return, from the easy-entry position into the comfort position, the backrest is settable upright from the easy-entry position into the comfort position by way of the switchable abutment, upon the switchable abutment striking against the counterpart abutment, switching out of the end position and, whereby the seat is subsequently movable over the longitudinal adjustment range and lockable to the seat part in one of the seat positions.

2. A vehicle seat according to claim 1, wherein the counterpart abutment is comprised by one of the rails or is formed at one of the rails in the region of the rails ahead of a rearmost seat position.

3. A vehicle seat according to claim 2, wherein the switchable abutment comprises at least one abutment pawl which has an abutment surface which corresponds with the counterpart abutment.

4. A vehicle seat according to claim 2, wherein the counterpart abutment is arranged on a fixed abutment rail.

5. A vehicle seat according to claim 1, wherein the seat part is, after the locking of the backrest to the seat part in one of the seat positions, displaceable over an entirety of the longitudinal adjustment range.

6. A vehicle seat according to claim 1, further comprising at least one switching element arranged between the switchable abutment and the easy-entry module.

7. A vehicle seat according to claim 6, wherein the switching element acts on the switchable abutment to switch the switchable abutment.

8. A vehicle seat according to claim 6, wherein the switching element comprises a spring arrangement whereby the switchable abutment is switchable at the one of the seat positions.

9. A vehicle seat according to claim 1, wherein the switchable abutment is arranged within and/or outside the rails.

10. A vehicle seat according to claim 1, wherein the switchable abutment is arranged on a movable part of at least one of the rails or on a frame element of the seat part.

11. A vehicle seat comprising:
a seat part;
a backrest;
rails, wherein the backrest is, together with the seat part, arranged so as to be longitudinally displaceable by way of rails along a movement travel over a longitudinal adjustment range at least between two seat positions;
an easy-entry module, wherein the backrest is adjustable relative to the seat part between at least one comfort position and at least one easy-entry position;
at least one switchable abutment, to limit the movement travel, provided in a region of the rails wherein:
with the backrest being moved from the comfort position into the easy-entry position, the switchable abutment is configured to override an end of the rails and to switch into an end position; and
with the backrest being moved in return from the easy-entry position into the comfort position, the switchable abutment strikes the end of the rails to switch out from the end position and the backrest is settable upright from the easy-entry position into the comfort position upon which the seat is movable over the longitudinal adjustment range and is lockable in one of the seat positions.

12. A vehicle seat comprising:
a seat part;
a backrest;
a backrest pivot adjuster connected to the seat part and the backrest for locking a pivot position of the backrest relative to the seat part to provide a backrest locked pivot state and for unlocking a pivot position of the backrest relative to the seat part to provide an unlocked pivot state;
rails, wherein the backrest is, together with the seat part, connected to the rails and is longitudinally displaceable by the rails along a movement travel over a longitudinal adjustment range at least between two vehicle seat positions;
a rail locking means for locking the vehicle seat in a vehicle seat position along the longitudinal adjustment range;
an easy-entry module connected to the rails and operatively connected to the backrest, wherein the backrest pivot adjuster is coupled to the easy-entry module for the unlocking of the rail locking means, wherein the vehicle seat is adjusted forward into the easy-entry vehicle seat position and the backrest is pivotable forward from a comfort backrest position to an easy-entry backrest position; and
at least one switchable abutment provided in a region of the rails and connected to the easy-entry module, wherein:
with the backrest in the easy-entry backrest position, the switchable abutment is configured to pass an end of the rails causing the switchable abutment to switch into an end position as the vehicle seat is moved into the easy-entry vehicle seat position; and
with the switchable abutment past the end of the rails, a return movement of the vehicle seat, out of the easy-entry vehicle seat position, causes the switchable abutment to strike the end of the rails to switch out from the end position, whereby the backrest is settable upright from the easy-entry backrest position into the comfort position and switch to allow uprighting locking with the backrest pivot adjuster and the vehicle seat is movable over the longitudinal adjustment range and is lockable in one of the seat positions.

13. A vehicle seat according to claim 12, wherein the end of the rails comprises a counterpart abutment in the region of the rails ahead of a rearmost seat position.

14. A vehicle seat according to claim 12, wherein the seat part is, after the locking of the backrest to the seat part in said one of the seat positions, displaceable over an entirety of the longitudinal adjustment range.

15. A vehicle seat according to claim 12, further comprising a switching element forming the connection between the switchable abutment and the easy-entry module, wherein the switching element comprises a spring arrangement switching a state of the switchable abutment at the one of the seat positions.

* * * * *